Nov. 7, 1967  V. L. FRANTZ  3,351,093
MANUALLY OPERABLE SOLENOID VALVE
Filed Dec. 27, 1963
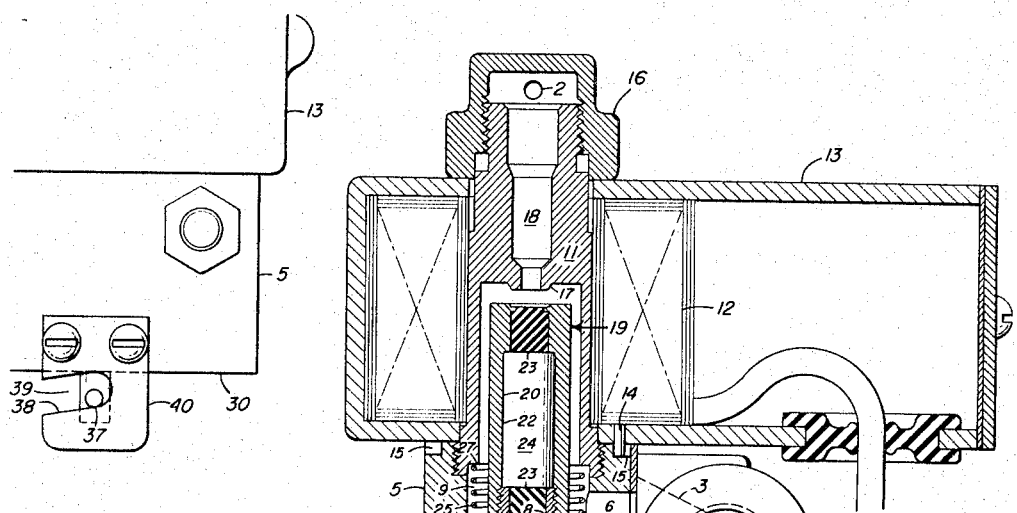
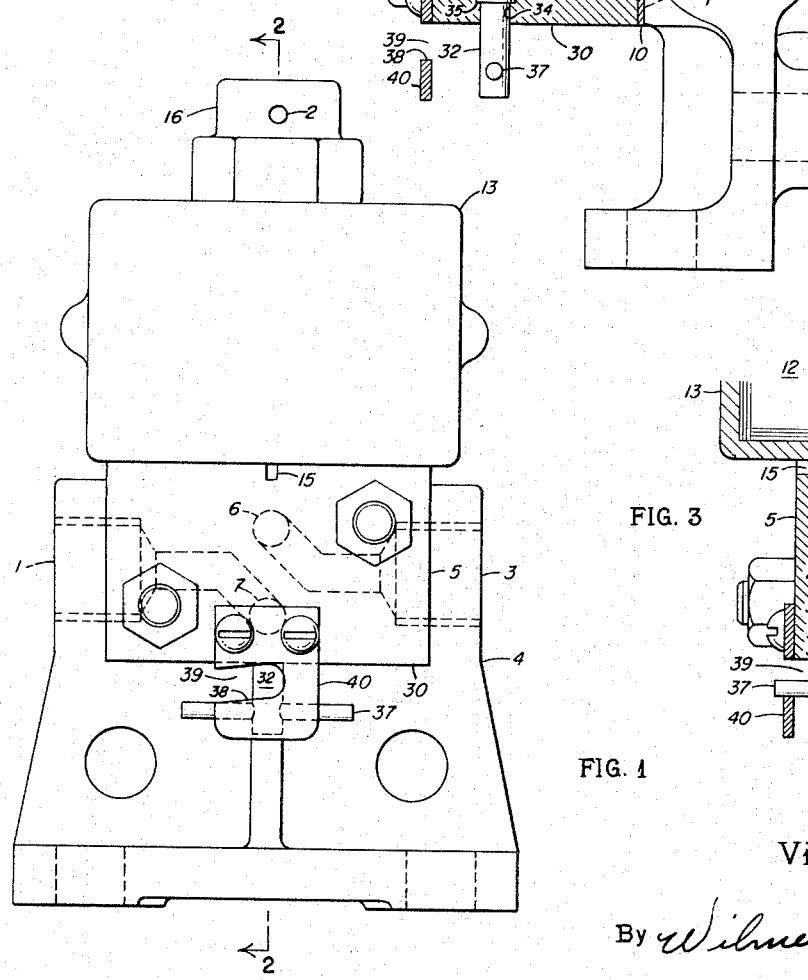
Inventor:
Virgil L. Frantz
By Wilmer Mechlin
his Attorney

United States Patent Office 3,351,093
Patented Nov. 7, 1967

3,351,093
MANUALLY OPERABLE SOLENOID VALVE
Virgil L. Frantz, Roanoke, Va., assignor to Graham-White Sales Corporation, Salem, Va., a corporation of Virginia
Filed Dec. 27, 1963, Ser. No. 333,994
4 Claims. (Cl. 137—625.27)

This invention relates to solenoid valves and has for its primary object the provision of an improved solenoid valve having a manually operable override for enabling the fluid pressure and electrical sides of the valve to be inspected and tested independently and the valve to be operated on a failure in the electrical side.

Another object of the invention is to provide a solenoid valve having an improved manual override which is simple and rugged in construction, effective and practically foolproof in operation, does not require close manufacturing tolerances and automatically compensates for wear.

Other objects and advantages of the invention will appear hereinafter in the detailed description, be particularly pointed out in the appended claims and be illustrated in the accompanying drawings, in which:

FIGURE 1 is an end elevational view of a preferred embodiment of the improved manually operable solenoid valve of the present invention;

FIGURE 2 is a view of the valve of FIGURE 1, partly in side elevation and partly in a vertical section taken along lines 2—2 of that figure;

FIGURE 3 is a fragmentary sectional view on the section of FIGURE 2 showing the manual override in overriding position; and FIGURE 4 is a side elevational view of the structure of FIGURE 3.

Referring now in detail to the drawings in which like reference characters designate like parts, the improved manually operable solenoid valve of the present invention can be normally open or closed and in either case is manually operable to simulate the action of the solenoid upon the plunger in the normal electrical operation of the valve.

Exemplary of the invention, the illustrated valve is generally similar to the valve of my Patent No. 2,887,126 of May 19, 1959, in having an outlet port 1 normally open or connected to an atmospheric bleed or exhaust port 2 and closed from an inlet port 3. The outlet and inlet ports 1 and 3 conveniently are formed in a permanently mountable mounting bracket 4, to which the corresponding air lines (not shown) are permanently connectable. A valve body or housing 5 of which the bracket 4 is actually a separable part, is bolted or otherwise releasably attached or secured to the bracket and the outlet and inlet ports 3 and 1, are connected, one by an outlet passage 6 and the other by an inlet passage 7, respectively to a side and through a lower valve seat 8 to a lower end of a valve chamber 9 in the body, with the joint between the body and the bracket sealed by a suitable gasket 10.

The upper part of the valve chamber 9 is contained in a coil pole 11 which is threaded or screwed into the body 5 and is surrounded by a solenoid 12. A casing 13 enclosing the solenoid 12 is supported about the coil pole 11 on the body 5. The casing 13 is selectively positionable relative to the body 5 to suit different installations, suitably by a positioning pin 14 on the casing and alternately fittable into a plurality of diametrically opposed or otherwise circumferentially spaced slots 15 in the body radially outwardly of the coil pole 11. A cap 16, in which the exhaust port 2 is readily formed as one or more radial drillings, is threaded or screwed onto the upper end of the coil pole and holds the solenoid 12 and its casing 13 in place.

In addition to the lower valve seat 8 at its lower end, the chamber 9 has an upper valve seat 17 at its upper end through which an exhaust passage 18 in the coil pole 11 opens upwardly into the gap 16 and onto the exhaust port 2. The normal connection of the outlet port 1 to the exhaust port 2 and its alternate connection to the inlet port 3, is determined by the position of a plunger 19 axially slidable, shiftable or reciprocable in the valve chamber 9 between the lower and upper valve seats 8 and 17. The preferred plunger 19 follows that of my Patent No. 2,887,126 in being formed of a casing 20 having a flanged plug or cap 21 threaded or screwed into its lower end and a through axial bore 22 in the ends of which are rubber pads 23 spaced by a rigid spacer 24. The plunger 19 is normally held in its lower position with its lower rubber pad 23 seating against and closing the lower valve seat 8, by a return spring 25 acting between the peripheral or radially outstanding flange 26 of its plug 21 and an opposing, downwardly facing shoulder 27 on the coil pole 11. On energizing of the solenoid 12, the plunger 19 is shifted against the yieldable resistance of the return spring, to its upper position in which its upper pad seats against the upper valve seat 17.

For manually overriding or simulating the action of the solenoid 12 on the plunger 19, there is provided in the body 5 below the plunger an override, push or shift rod, piston or plunger 28. Extending or directed vertically or longitudinally or axially of the body 5 and the valve chamber 9, and slidable or shiftable in the same direction as the plunger 19 relative to the body, the override rod 28 is offset laterally or radially relative to the axis of the plunger to clear the lower valve seat 8 and the inlet passage 7 and underlies and is engageable with the under- or confronting side of the flange 26 of the plug 21. The rod 28 rides or slides in a correspondingly directed aperture 29 in the body 5 at one side of the lower valve seat 8, which extends between and opens at opposite ends onto the valve chamber 9 and the lower or adjoining end 30 of the body. Projecting or extending beyond the end 30 of the body, the rod 28 is pushable or projectable manually and by acting upwardly or inwardly against the flange 26, is able to unseat or displace the plunger 19 from the lower valve seat 8 and shift or move it upwardly or axially to its alternate position in which it seats against and closes the upper valve seat 17. Conversely, release of the force on the rod 28 opposing the return spring 27, enables the latter to return both the rod and the plunger 19 to initial or normal position.

Stopping or limiting of the downward or outward movement of the override or push rod 28 and fixing its normal or at rest position relative to the body 5, conveniently is obtained by providing the rod with an upper or inner part or head 31, relatively enlarged or of larger cross-section than its lower part or stem 32, and dividing the aperture 29 into an upper part or cavity 33 and lower part or bore 34, respectively, slidably receiving and of substantially the cross-section of the head and the stem. Limited in its downward or outward movement in the preferred construction by an inbuilt rather than applied stop, in the form of the upwardly or inwardly facing shoulder 35 between the cavity 33 and the bore 34, the rod 28 preferably has on its head 31 a rounded or arcuately convex upper end for engagement with the flange 26. The joint between the head 31 and the cavity 33 is sealed against leakage of fluid from the pressure chamber 9 by suitable means, such as the illustrated O-ring 36 carried by the head.

The override rod 28 is designed to be releasably held or locked in an upward position which, rather than being fixed, is variable as necessary to ensure full seating of the plunger 19 against the upper valve seat 17, despite wear and without requiring close manufacturing tolerances in the valve. This is accomplished by the use as the holding or locking means of camming means preferably formed by a radial projection 37 on the stem 32 below the body 5 and an upwardly or inwardly facing cam or camming face or surface 38 on, rigid with or attached or secured to the body, with the slope or inclination of the surface such that the frictional engagement between it and the projection will hold the projection in whatever position among a plurality along the surface is needed for full seating of the particular plunger.

Retractable or removable to permit assembly, the radial projection 37 conveniently is a cross-pin having a driving or press fit in the stem 32. The cooperating cam 38 in turn conveniently is the lower edge of a slot 39 in a locking, holding or retainer plate or bracket 48 bolted or otherwise removably attached to the body 5 at a side of the rod 28 and projecting below the body's lower end for presenting the slot to receive and the cam to engage one of the arms of the cross-pin 37.

With the preferred locking means thus formed by the cross-pin 37 and the slotted plate 40 and the rod 28 and aperture 39 both cylindrical to permit the relative axial and rotative movements therebetween, locking of the plunger 19 in the position in which it opens the lower valve seat 8 and seats against and closes the upper valve seat 17 and for connecting the inlet and outlet ports 3 and 1, is simply a matter of pushing the rod into the point where an arm of the pin is receivable in the slot 39, turning the rod by the cross-pin until one of the latter's arms engages the cam 38 and then continuing to turn the rod with the arm sliding along the cam until further turning is stopped by the seating of the plunger against the upper valve seat. Release of the plunger 19 from the consequent overriding action of the rod 28 involves only turning of the rod in the opposite direction until the pin 37 is free of the slot 39, whereupon the return spring 25 will return both the plunger and rod to initial position and close the connection between the inlet and outlet ports 3 and 1. Not only does the preferred holding means ensure that the manual override will operate properly without requiring close manufacturing tolerances but the position of the pin 37 relative to the slot 39 indicates visually whether the valve is in normal or override condition.

In disassembling the preferred valve for access for repair or replacement to its parts, the cap 16 is unscrewed from the coil pole 11 and the solenoid 12 and its casing 13 are then slid off the pole. Thereafter, the coil pole 11 is unscrewed from the body 5 to expose the plunger 19, with the only additional step required, the removal of the cross-pin 37 if it is wanted to replace either the rod 28 or its O-ring 36.

From the above detailed description it will be apparent that there has been provided an improved manually operable solenoid valve which not only is simple and rugged in construction but can be operated manually without the close manufacturing tolerances in either the manual override or the fit between the plunger and the body which heretofore had been necessary. It should be understood that the described and enclosed embodiment is merely exemplary of invention and that all modifications are intended to be included that do not depart from the spirit of the invention or the scope of the appended claims.

Having now described my invention, I claim:

1. A manually operable solenoid valve comprising a body mounting a solenoid, a valve chamber in said body, valve seats at opposite ends of said chamber, a plunger in said chamber and shiftable axially thereof for alternately closing said seats, spring means acting between said body and plunger for normally holding said plunger in a position to close one of said seats and yieldably resisting shifting thereof on energizing of said solenoid to another position to close said other seat, manually operable override means in said body and shiftable therein axially of said chamber, said override means on manual operation projecting into said chamber against an end of said plunger for shifting said plunger to said other position, and cam means rigid with said body and frictionally engageable in any of a plurality of positions along a surface thereof by means on said override means for releasably holding said plunger in said other position.

2. A manually operable solenoid valve comprising a body mounting a solenoid, valve seats at opposite ends of said chamber, a valve chamber in said body, a plunger in and shiftable axially of said chamber for alternately closing said seats, spring means acting between said body and plunger for normally holding said plunger in a position to close one of said seats and yieldably resisting shifting thereof on energizing of said solenoid to another position to close said other seat, manually operable override means in said body beyond said plunger and shiftable therein axially of said chamber, said override means on manual operation projecting into said chamber against an end of said plunger for shifting said plunger to said other position, and cam means rigid with said body and frictionally engageable in any of a plurality of positions along a surface thereof by means on said override means for releasably holding said plunger in said other position, said plunger and override means on disengagement of said means on said override means from said cam means returning to normal position under force of said spring means.

3. A solenoid valve comprising a valve body mounting a solenoid, a valve chamber in said body, valve seats at opposite ends of said chamber, an aperture in said body extending longitudinally of said chamber and opening from an end thereof onto an end of said body, a plunger shiftable axially in said chamber for alternately closing said seats and in a normal position closing one thereof, spring means in said chamber and yieldably resisting shifting of said plunger on energizing of said solenoid out of said normal position to another position to close the other seat, an override rod mounted in said aperture for axial and rotative movements relative to said body, said rod projecting outwardly beyond said end of said body and normally being disposed outwardly of and confronting an end of said plunger, handle means attached to said rod outwardly of said body for transmitting said relative axial and rotative movements thereto, said rod on inward axial movement thereof projecting into said chamber and acting on said end of said plunger for shifting said plunger to said other position, and cam means releasably attached to said body, said handle means on said inward axial and rotative movements of said rod being frictionally engageable with said cam means in any of a plurality of positions along a surface thereof for releasably holding said rod in projected position and said plunger in said other position, and said plunger and rod on disengagement of said handle means from said cam means being returnable to normal position under force of said spring means.

4. A solenoid valve comprising a valve body mounting a solenoid, a valve chamber in said body, an aperture in said body and extending longitudinally of said chamber and opening from an end thereof onto an end of said body, a plunger shiftable axially in said chamber for alternately closing said seals and in a normal position therein, spring means in said chamber and yieldably resisting shifting of said plunger on energizing of said solenoid out of said normal position to another position to close the other seat, an override rod mounted in said aperture for axial and rotative movements relative to said body, said rod projecting outwardly beyond an end of said body and normally being disposed outwardly of and confronting an end of said plunger, means rigid with said body for limiting outward movement of said rod relative thereto, sealing means in said aperture and acting therebetween and said rod for sealing against leakage from said chamber, handle means removably attached to said rod outwardly of said body for transmitting said relative axial and rotative movements thereto, said rod on inward axial movement thereof projecting into said chamber and acting on end of said plunger for shifting said plunger to said other position, and cam means releasably attached to said body, said handle means on said inward axial and rotative movements of said rod being frictionally engageable with said cam means in any of a plurality of positions along a surface thereof for releasably holding said rod in projected position and said plunger in said other position, and said plunger and rod on disengagement of said handle means from said cam means being returnable to normal position under force of said spring means.

References Cited

UNITED STATES PATENTS

| | | | |
|---|---|---|---|
| 1,674,914 | 6/1928 | Murray | 251—130 |
| 1,888,130 | 11/1932 | Huffman | 251—100 |
| 2,571,356 | 10/1951 | Gates | 251—263 |
| 2,695,154 | 11/1954 | Dillman | 251—130 X |
| 2,861,594 | 11/1958 | Collins | 251—139 X |

FOREIGN PATENTS 214,632  3/1958  Australia.

M. CARY NELSON, *Primary Examiner.*

R. C. MILLER, *Assistant Examiner.*